Nov. 25, 1947. W. O. KEELING 2,431,485
PROCESS FOR CONVERTING HYDROCARBONS
Original Filed Dec. 19, 1940
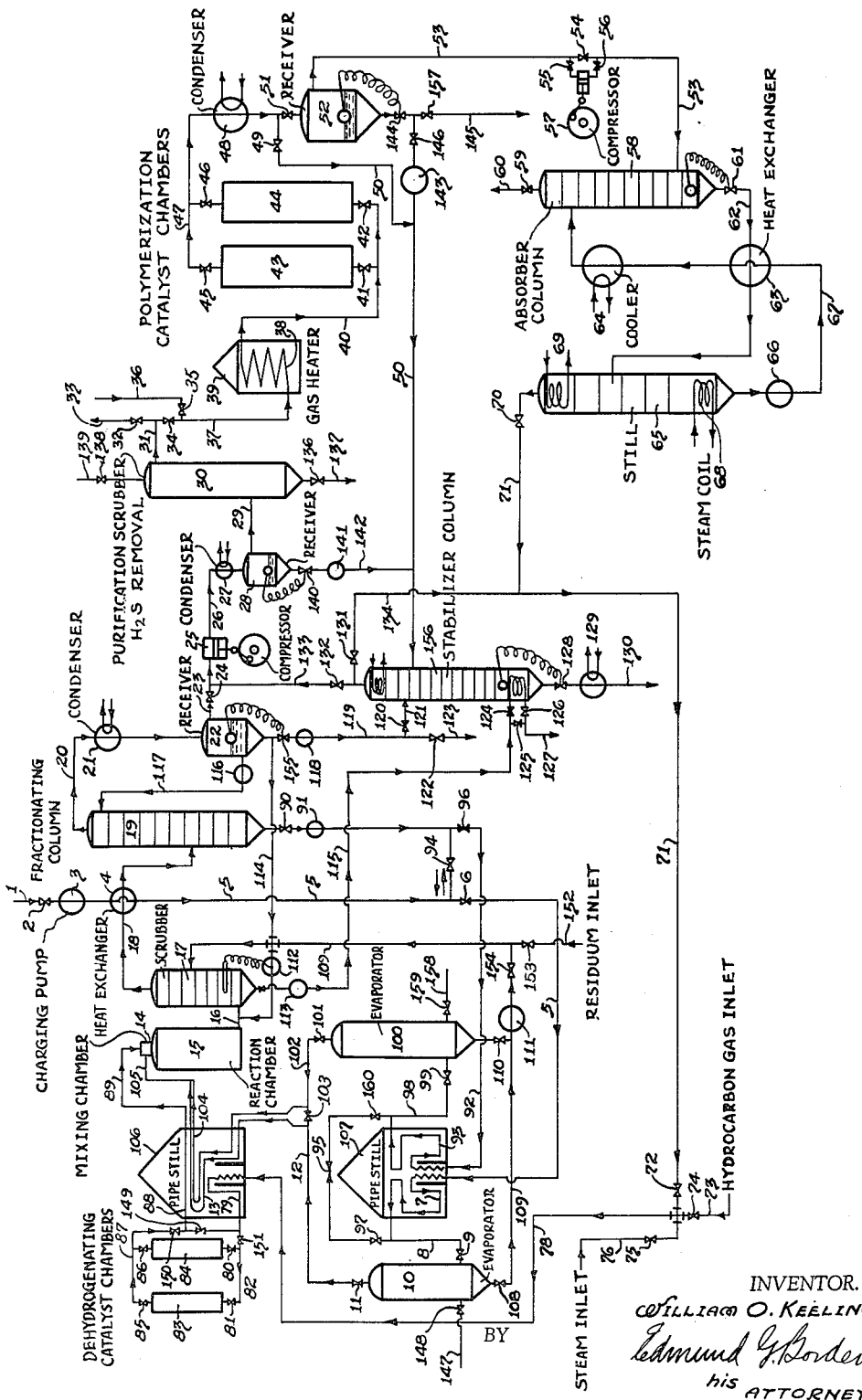
INVENTOR.
WILLIAM O. KEELING.
BY Edmund G. Borden
his ATTORNEY.

Patented Nov. 25, 1947

2,431,485

UNITED STATES PATENT OFFICE 2,431,485

PROCESS FOR CONVERTING HYDRO-
CARBONS

William O. Keeling, Mount Lebanon, Pa.

Continuation of application Serial No. 370,827,
December 19, 1940. This application January
11, 1945, Serial No. 572,380

14 Claims. (Cl. 196—66)

This invention relates to a process for converting hydrocarbons of less valuable properties into products having more valuable properties, and more particularly to the combination of vapor-phase cracking, polymerization, and dehydrogenation in such a manner as to result in a single, unitary process by means of which increased yields of motor fuel, having high octane ratings, are obtained in a novel and economical manner.

This application is a continuation of my application Serial No. 370,827, filed December 19, 1940, for Process of converting hydrocarbons.

This application is a continuation-in-part of my co-pending application, Serial Number 101,765, filed September 21, 1936, and Patent No. 2,363,532, issued November 28, 1944, which disclosed a cracking process in which conversion occurs, in the vapor-phase, in two stages. In the primary conversion stage, the necessary heat was supplied to the vapors being converted by indirect heat exchange; as for example, in a pipe-still coil; and in the secondary stage by direct admixture of the vapors with a suitable heat carrier gas.

Dehydrogenation of saturated hydrocarbons by means of heat or the combination of heat and catalysts has long been known in the art. When heat alone is used, it is difficult to carry the dehydrogenation to a satisfactory degree of completion without causing other and undesirable reactions. But when catalysts are used in conjunction with heat, dehydrogenation may be carried out almost quantitatively and, by suitable regulation of temperature and space velocities, without causing a substantial amount of undesirable reactions. Dehydrogenation by means of heat alone is ordinarily carried out at temperatures ranging from approximately 1100°–1800° F. But with catalysts, it may be carried out at temperatures ranging from approximately 600°–1500° F., depending upon the catalyst used. For the purpose of this invention, either method of dehydrogenation may be used. Where a limited amount of hydrocarbons suitable for a heat carrier gas is available, and where a very high heat carrier gas temperature is desired, dehydrogenation by means of heat alone may be practiced. Where moderate heat carrier gas temperatures as well as a maximum volume of the resulting unsaturated gases are desired, dehydrogenation by means of a suitable catalyst may be practiced.

Similarly, polymerization of unsaturated hydrocarbons can be accomplished by the application of heat and pressure. But polymerization may be speeded up and larger yields of polymers obtained by the use of catalysts, the temperatures and pressures used varying with the nature of the catalyst. In this process some polymerization of the unsaturates in the heat carrier gas may occur in the cracking stage, but the major portion will preferably occur in the subsequent polymerization zone, where conditions of temperature and pressure are maintained which are primarily suited to promote polymerization by the particular catalyst employed. These temperatures and pressures may vary from 300° to 1100° F., and from atmospheric up to several thousand pounds per square inch, depending on the catalyst.

Numerous processes for cracking hydrocarbons have been proposed, but the one preferred is that disclosed in my copending applications, Serial Numbers 101,765 and 597,692. In this process the charging stock is vaporized, the evolved vapors separated from any unvaporized residue; the vapors are then further heated by indirect heat exchange as in a pipe-still coil, and cracking is completed by directly admixing the heated vapors with a suitable heat carrier gas of sufficient volume and temperature to supply the necessary amount of heat to complete the conversion.

I have found that the steps of vapor-phase cracking, dehydrogenation, and polymerization, with certain modifications to be described, can be combined into a single, unitary process for converting hydrocarbons into motor fuels of high octane rating, with greater yields and at less cost than if these three steps were separately practiced on the same charging stocks.

As preferably practiced in this invention, the combination of these three steps is substantially as follows: Hydrocarbons, preferably those containing from 2 to 6 carbon atoms, are dehydrogenated at temperatures ranging from about 800°–1600° F., and controlling the dehydrogenating conditions so that the predominant reaction is splitting off 2 atoms of hydrogen from each hydrocarbon molecule to form the corresponding unsaturate. Steam may be added to the gases when using certain catalysts. Then without cooling, the resulting products are utilized as the heat carrier gas in the second or vapor-phase cracking stage. If necessary, further heat can be added to or extracted from these products, in any suitable manner, before they are admixed with the oil vapors in the cracking stage. The particular charging stock to be cracked is first vaporized, and the resulting vapors separated from any unvaporized material. The vapors are then further heated by indirect heat exchange, as in a pipe-still coil, to a predetermined temperature which depends upon the ultimate degree of cracking desired. The superheated vapors are then admixed with the dehydrogenation products from the first stage and the mixture is discharged into an enlarged space, or reaction chamber, of suitable diameter and length to provide the proper time interval required for the completion of the selected degree of conversion. As the conversion products leave the reaction chamber, they are cooled below the temperature at which further conversion would occur, by a spray of cool, previously formed distillate. The reaction temperature and time interval selected for the cracking are those which cause a minimum of undesirable side-reactions, such as forming tar, free carbon, etc. But if any of these undesired products are present in the reaction products, they are removed by scrubbing the cracked products with a heavy residuum. The cracked products are cooled, fractionated, and separated into recycle cracking stock, cracked motor fuel and fixed gases. These gases containing olefins from the first stage and fixed gases formed in the cracking stage are collected and passed at the necessary temperatures and pressures over suitable polymerizing catalysts; whereby, polymers, suitable for motor fuel, and having a high octane rating, are formed and by cooling and condensing are separated from any fixed gases remaining unconverted. These final fixed gases are then separated into gases having two or more carbon atoms and methane and hydrogen. The former are recirculated through the dehydrogenating and subsequent stages of the process. The hydrogen and methane are partly or wholly vented from the system for such use as is deemed advisable.

It is apparent that, as thus described, the process is self-supporting in the sense that the fixed gases formed in the cracking zone make up the feed stock to the polymerizing and dehydrogenation zones. As thus operated, the final products of the process are cracked tars from the cracking zone, cracked motor fuel, polymer gasoline, and fixed gases composed principally of hydrogen and methane. By close control of the temperature-time relationship used in the cracking zone, the amount of cracked tars formed will remain substantially constant over a rather wide range of cracking temperatures used. But the relationship between the volume of cracked gasoline and polymer gasoline is a function of amount of fixed gas formed in the cracking zone. If it is desired to increase the yield of polymer gasoline, it is done by increasing the amount of fixed gases formed in the cracking zone at the expense of the cracked gasoline yield, by increasing the severity of the cracking conditions maintained in the cracking zone. Under these conditions the volume of polymer gasoline is increased and the volume of cracked gasoline is decreased, but the latter has a higher octane rating, and since polymer gasoline has a very high octane rating, the octane rating of the combined polymer and cracked gasolines can be very materially increased at but little sacrifice in combined volumes.

When it is desired to increase the yield of polymer gasoline without decreasing the yield of cracked gasoline, it can be done by augmenting the volume of gases, recycled from the polymerization zone to the dehydrogenation zone, with suitable hydrocarbon gases from an outside source. These gases preferably contain from 2 to 6 carbon atoms, such as ethane, propane, the butanes, pentane, and hexanes, or even light, natural gasoline, either alone or in combination. And in passing through the dehydrogenation zone, these are dehydrogenated along with the recycled gases from the polymerization zone. As a result, the total quantity of unsaturates produced, to be subsequently polymerized to gasoline, is increased by an amount substantially equal to the quantity of gases added from the outside source. By this procedure, the yield of polymer gasoline can be varied between rather wide limits without material change in the yields of cracked gasoline.

The two factors of primary importance in determining the yields per cycle obtained in the cracking zone are the cracking temperatures and reaction time intervals used. Yields may be maintained constant even though the temperature-time conditions are varied. For instance, if cracking temperatures are raised, the reaction time must be shortened, and if the reaction time is lengthened, the reaction temperature must be lowered. Desired yields in the cracking zone are obtained, when adding hydrocarbon gases from outside sources, by suitable adjustments of the temperature-time conditions used. Temperature conditions are varied by varying the temperatures at which the dehydrogenated gases and oil vapors enter the cracking zone. Since the dehydrogenated gases and the oil vapors are separately heated, there is an almost unlimited flexibility as to control of resulting temperature attained upon their admixture. The reaction time is controlled by the variation in volumes of the gases and oil vapors, at constant pressure, or by suitable pressure variations in the cracking zone, since all material passing therethrough is in the vapor phase.

Separation of the cracking reaction products is obtained by conventional methods in conventional equipment as will be described elsewhere. All cracked tars and free carbon formed in the cracking zone are separated from the remaining reaction products in the scrubber and from thence are withdrawn from the system. Insufficiently cracked charging stock is separated from the remainder of the reaction products in the fractionating equipment, and is withdrawn therefrom and recycled through the cracking zone. Cracked motor fuel is separated from the fixed gases in suitable condensing and separating devices, and is withdrawn therefrom for such further treatment as is desired. The fixed gases remaining are the feed stock for the subsequent polymerizing zone. If a very low sulfur content of the polymerized motor fuel, as well as cracked motor fuel, is desired, the hydrogen sulfide contained in the fixed gases is removed by any suitable methods and means before the gases are passed through the polymerizing zone. If no hydrogenation of polymer products is desired in the polymerization zone, or if hydrogen interferes with the action of the selected polymerization catalyst, it, too, may be separated from the hydrocarbon gases before the latter are passed through the polymerization zone, by any suitable method and means. Although methane does not seriously interfere with the polymerization of unsaturates, it is insensible to the usual dehydrogenating catalysts, used subsequent to the polymerizing zone, and unless it be needed as a heat-carrying agent in the cracking zone, may be eliminated from the system along with the hydrogen.

The remaining fixed gases are then passed through the polymerization zone and over a suitable catalyst under such conditions of temperature and pressure as are best suited to the particular catalyst used. I reserve the right to the use of any suitable catalyst, but for the sake of illustration will describe the use of one such catalyst. The gases are compressed to 250–500 pounds per square inch pressure and passed through a heater in which they are heated to 350°–500° F., and under these pressures and temperatures are passed through catalyst cases filled with solid phosphoric acid catalyst. In passing over the catalyst, the unsaturates are polymerized to compounds boiling within the motor fuel range. If hydrogen and methane have been removed from the fixed gases, the products leaving the catalyst cases could be cooled to 165°–200° F. and passed directly into a stabilizer where the polymers suitable for motor fuel are separated from any remaining gases boiling below a selected temperature. Such gases will be largely ethane, propane, and the butanes, or the corresponding olefins. These gases are part, at least, of the feed stock for the dehydrogenating zone. If hydrogen and methane have not been removed from the fixed gases prior to polymerization, the polymer products leaving the catalyst cases can be cooled and the liquefiable portion condensed and separated from the uncondensed portion. The condensed liquid can then be sent to a stabilizer where it is freed of undesirable light fractions such as propane and butane. The uncondensed portion is then sent through an absorption unit in which the hydrogen and part, or all, of the methane in the gas are separated therefrom and vented from the system. The remaining portion of the gas then serves as part, at least, of the feed stock to the dehydrogenating zone.

The feed stock to the cracking zone may range from light naphthas, for reforming, to heavy residuums. All portions of the feed stocks which are vaporizable under operating conditions pass through the cracking zone. Such portions as are not vaporizable are separated from the vaporized portions and are withdrawn from the vaporizing stage. Heavy residuums may have their vaporizable portions increased by vis-breaking prior to vaporization. By vis-breaking is meant mild cracking to gas oil in the liquid phase. The fresh feed and recycle stock may be separately heated and vaporized, as when the fresh stock is a heavy residuum; or they may be combined, heated, and vaporized together as when gas oil is the fresh charging stock.

The accompanying diagrammatic drawing illustrates one specific form of apparatus embodying the features of the present invention and wherein the process of the invention may be practiced. However, it is not intended to limit the invention to the specific form of apparatus illustrated.

Referring to the drawing, fresh charging stock for the system is supplied through line 1 and valve 2 to pump 3, which forces the fresh charge into line 5 and through heat exchanger 4, where it receives heat indirectly from the hot vapors leaving the scrubber. It next passes through valve 6, which by judicious manipulation in conjunction with valves 94 in a by-pass line and 96 in recycle stock line 92, regulates the distribution of fresh charging stock and recycle stock between heating coils 7 and 93. When a heavy residuum is the fresh charging stock, valve 94 is closed and valves 6 and 96 are opened so that the residuum is separately heated in coil 7 and the recycle stock in coil 93. When gas oil is the charging stock, valve 94 is opened and valves 6 and 96 are manipulated so that the fresh charging stock and recycle stock are distributed in proper proportions between coils 7 and 93. This distribution is further facilitated by by-pass 95 and valves 97 and 160 in conjunction with valves 9 and 99. The charging stock passing through line 5 enters heating coil 7, where it is heated to above its vaporizing temperature at system pressure, and is then discharged into line 8 and passes through valve 9 into evaporator 10. When a heavy residuum is the fresh charging stock, sufficient pressure is maintained on coil 7 by valve 9 to enable the residuum to be vis-broken in coil 7. In evaporator 10, the vapors are flashed from the heated oil and are separated from any unvaporized residue. The vapors leave the evaporator through valve 11 and pass through line 12 into the superheater coil 13 located in pipe-still 106, in which they are heated to the desired temperature. They may even be partially cracked in this coil if desired. The superheated vapors leave coil 13 and enter line 105, passing therethrough into mixing chamber 14. The recycle stock passes through valve 96 and line 92 into heating coil 93, where it is heated to a point above its vaporization temperature at system pressure, and is discharged through line 98 and valve 99 into evaporator 100, where vaporization occurs. The vapors are separated from any unvaporized residue and leave the evaporator through valve 101, and pass through line 102 into the superheating coil 104 located in pipe-still 106. In this coil they are heated to any desired temperature, even being partially cracked, if desired, and are discharged therefrom into line 105, and thence into mixing chamber 14. To keep heating coils 13 and 104 in balance, vapors on the way to these coils through lines 12 and 102 may be distributed between the coils by means of by-pass valve 103.

The mixing chamber is any suitable device for thoroughly and substantially instantaneously admixing the superheated vapors with the dehydrogenated heat carrier gas. The purpose of this procedure is to insure a thoroughly homogeneous mixture at uniform temperature throughout showing that perfect heat exchange by direct contact is had between all parts of the heat carrier gas and the oil vapors. This transfer is accomplished by making the admixture take place practically instantaneously so that no substantial amount of cracking can occur in the mixing chamber.

The mixture is then expanded, or discharged, from the mixing chamber into the reaction chamber 15. This chamber has an open space of such diameter and length as will provide a predetermined cracking time interval while the mixture is travelling therethrough. The chamber is lined with refractory and is well insulated internally or externally, or both, so that the cracking reaction occurs substantially adiabatically. The free space in the chamber can be varied by the addition or removal of concentric rings of suitable refractory shapes with which the chamber can be lined. The purpose of such lining is to enable variation of reaction times while keeping the pressure within the chamber at a preferred figure. By precisely controlling the temperature of the gas and oil vapor mixture entering the reaction chamber and the time interval during which the mixture remains in the chamber, such precise control of the cracking reaction is had, that of the original volume of 30° API gas oil charging stock, I have recovered in excess of 70% as cracked gasoline with a production of less than 4% as cracked tar.

The reaction products leave the reaction chamber through pipe 16 and enter scrubber 17. While passing through 16, or just after entering 17, the temperature of the reaction products is lowered to a point at which no further cracking will occur by the injection of light, previously formed distillate. This distillate is withdrawn from receiver 22 through line 114, and is forced by pump 112 into the stream of reaction products. The amount of this cooling distillate injected or atomized into the reaction products is controlled by a thermostat control of the speed of the pump 112. The thermocouple of the thermostat is placed in the stream of reaction products at a point subsequent to the introduction of the quenching liquid. When set at a desired temperature, the thermostat forces the pump to deliver only the amount of quenching liquid as will cool the reaction products to the desired temperature. While passing through the scrubber, the partly cooled reaction products are thoroughly scrubbed with the heavy residuum oil withdrawn from the evaporators 10 and 100 through valves 108 and 110, then through line 109, and forced by pump 111 through valve 154 into the scrubber. In case the residues from 10 and 100 are insufficient in volume, a heavy residuum may be introduced into the system through line 152 and valve 153 into line 109 for use in the scrubber.

The fuel oil, or cracked tar, is withdrawn from the scrubber by pump 113 which forces the oil into line 115. The sensible heat in this oil may be utilized to supply the heat requirements of the stabilizer column by closing valve 125 and forcing the hot oil through valve 124 into the heating coil in the base of the column and out through valve 126 into line 127 and thence to storage. If an excess of hot fuel oil is available, part of it may be by-passed through valve 125 around the heating coil in the base of the stabilizer.

The partly cooled and thoroughly scrubbed reaction products vapors leave the scrubber 17 through line 18, passing through heat exchanger 4, in which they give up part of their sensible heat to the fresh incoming charging stock, and pass on into the fractionating column 19. In this column the hydrocarbons boiling above the boiling point range for motor fuels are fractionated out of the reaction products and are refluxed back into the base of the column. The hydrocarbons boiling within the boiling point range of motor fuel, and all fixed gases leave the top of the column through line 20, passing through condenser 21, where the cracked motor fuel fraction is condensed, and into receiver 22. The reflux medium used for the fractionation in column 19 is part of the cracked motor fuel condensate which collects in receiver 22. It is picked up by reflux pump 116 and forced through line 117 onto one of the top trays of column 19.

The condensed motor fuel, collected in the bottom of receiver 22, is withdrawn therefrom through a liquid-level controlled valve 155, passing through pump 118, which forces it through line valve 119 and valve 122 into line 123 leading to cracked gasoline storage or such other destination as is desired. Or if a stabilized product from the cracking unit is desired, valve 122 is closed, valve 120 opened and pump 118 forces the cracked motor fuel from receiver 22 through line 121 into a stabilizer column 156, where all propane and lighter hydrocarbons are separated from the motor fuel and driven off, and only such butane is allowed to remain in the motor fuel as is necessary to cause a desired Reid vapor-pressure for the motor fuel, the excess butane being driven off with the propane and lighter hydrocarbons. The stabilized motor fuel descends the stabilizer column 156 into the base thereof from which it is withdrawn through a liquid-level controlled valve 128 and cooler 129 and line 130 to the stabilized motor fuel storage. The gases expelled from the stabilized motor fuel may be forced through valve 131, valve 132 being closed, into line 134 and thence into line 71 containing heat carrier gases, or it may be forced through valve 132, valve 131 being closed, into line 133 and thence into line 23 leading to the suction side of compressor 25.

The fixed gases, separated from the cracked motor fuel in receiver 22, are withdrawn through line 23 and valve 24, by means of which the pressures in the cracking zone are regulated, and are drawn into the suction side of compressor 25, which compresses them to the pressure required for subsequent treatments. The compressed gases leave the compressor through line 26, passing through partial cooler 27, in which they are cooled to a temperature adequate to condense out the pentane or heavier fractions the gas may contain and enter receiver 28 where any condensate formed in 27 is separated from the remaining fixed gases. This condensate is withdrawn through the liquid-level controlled valve 140 by pump 141 and is forced through line 142 into line 50 and thence into the stabilizer column 156. The remaining fixed gases pass from receiver 28 through line 29 into scrubber 30, in which they are contacted with a sulfur-removing agent which removes the hydrogen sulfide the gases usually carry. Any suitable sulfur-removing agent may be used. By way of examples, such materials as Thylox, sodium carbonate, and certain amine solutions or even water, under high pressures, are suitable. These agents are introduced through line 139 and valve 138 into the scrubber 30, passing downward countercurrent to the ascending gases, and leave the scrubber through valve 136 and line 137. These solutions may be regenerated in suitable equipment, not shown, and recirculated through scrubber 30, if desired. The purified gases leave scrubber 30 through line 31 for the subsequent polymerizing treatment.

If a polymerizing catalyst is used whose action is interfered with by hydrogen, the fixed gases pass through valve 32, valve 34 being closed, and line 33 to equipment not shown for separating the $C_2$ and heavier hydrocarbons from the hydrogen and methane. The remaining hydrocarbon gases are then passed back into the system through line 36 and valve 35 into line 37.

If the hydrogen and methane have no effect on polymerization by the particular catalyst used or if appreciable hydrogenation of the polymers is desired, as with mixed catalysts, the fixed gases pass through line 31 and valve 34, valves 32 and 35 being closed, and line 37 into coil 38 located in gas heater 39. The gases are heated in coil 38 to a temperature best suited for the particular catalyst used and pass through line 40 and alternately through valves 41 and 42 into catalyst chambers 43 and 44, and thence, through valves 45 and 46 into line 47. This arrangement is made so that catalyst chambers 43 and 44 can be used alternately. That is, the catalyst in one chamber can be used for catalyzing polymerization, while the catalyst in the other chamber is being revivified. The polymerization products then pass through line 47 into the condenser 48 where polymers, boiling within the motor fuel boiling point range, are condensed.

When hydrogen and methane are separated from the fixed gas by passing the gas through line 33 to suitable separating equipment not shown, the polymerization products leave condenser 48, passing through valve 49, valve 51 being closed, and pass through line 50 into the stabilizer column 156, where the remaining fixed gases are separated from the polymers boiling within the motor fuel boiling point range and pass through valve 131, valve 132 being closed, into line 134 and thence into line 71. If hydrogen and methane have not been previously separated from the fixed gases, the polymerization products pass from the the condenser 48 through valve 51, valve 49 being closed, into receiver 52 where the liquid polymers are separated from the remaining fixed gases. The liquid polymers drain from receiver 52 through liquid-level controlled valve 144 and, if stabilization at this time is not desired, through valve 157, valve 146 being closed, into line 145 and thence to storage. If stabilization is desired at this time, the liquid polymer passes through valve 146, valve 157 being closed, through pump 143, thence into line 50 and into the stabilizer column 156. The remaining fixed gases leave the receiver 52 through line 53 and valve 54 and enter absorber column 58, where the gases are scrubbed with a suitable menstruum which absorbs all $C_2$ and heavier hydrocarbons. If the pressure of the fixed gases leaving receiver 52 is insufficient to insure the absorption of all $C_2$ and heavier hydrocarbons in the absorber column 58, then valve 54 is closed, valves 55 and 56 are opened, and the gases are passed through compressor 57 in which they are compressed to a suitable pressure. The compressed gases are then passed through a cooler, not shown, in which they are cooled to a suitable temperature for absorption, and are then discharged into line 53, passing into absorber column 58. The cooler, not shown, is of conventional design and may even be the evaporator of a refrigerating machine if very low temperatures are needed for suitable absorption in 58. The gases passing upward through the absorber column 58 are countercurrently scrubbed with a suitable scrubbing menstruum which absorbs all $C_2$ and heavier hydrocarbons. The remaining hydrogen and methane leave the column through valve 59 and line 60, passing to the plant fuel line or such other destination as is desired. The absorption menstruum leaves the base of the column passing through liquid-level controlled valve 61 into line 62, thence through heat exchanger 63 where it is heated up by indirect heat exchange with hot gas-free absorption menstruum from still 65 and enters still 65. In the still the gases are driven out of the absorbing menstruum by heat supplied through steam coil 68, and some open steam if desired, and leaves the still through valve 70, entering line 71. Any of the absorbing menstruum vaporized and carried by the gases leaving the still are condensed by reflux condenser 69 and refluxed back down the still column. The hot gas-free absorbing menstruum collects in the base of the still and is withdrawn by pump 66, forced into line 67, through heat exchanger 63, where it gives up a portion of its sensible heat to cold solution from absorber column 58, then passes through cooler 64 where it is cooled to the temperature found necessary for the most efficient separation of gases in column 68, and then enters the top of column 68. The cooler 64 may be the evaporator of a refrigerating machine, if low temperatures are found necessary.

The gases, discharged through valve 70 and line 134 into line 71, consist largely of hydrocarbons capable of being dehydrogenated and subsequently polymerized into compounds useful as motor fuel. From 71 they pass through valve 72 into line 78, and from thence into heating coil 79 located in pipe-still heater 106. If desired, steam may be added to these gases, through line 76 and valve 75, or if their volume is to be augmented by hydrocarbon gases from outside sources, such gases may be added through line 73 and valve 74. If thermal dehydrogenation only is to be used, valves 150 and 151 are closed and the gases are passed through valve 149 into superheating coil 88, thence into line 89, and are finally discharged into the mixing chamber 14. If catalytic dehydrogenation is to be used, valve 149 is closed and the gases pass through valve 151 into line 82, and then alternately through valves 80 and 81, dehydrogenating catalyst chambers 83 and 84, valves 85 and 86 into line 87. Catalyst chambers 83 and 84 are used alternately so that the catalyst in one may be used for dehydrogenating the hydrocarbon gases, while the catalyst in the other is being revivified. The dehydrogenated gases pass from line 87 through valve 150 into superheating coil 88, where they are heated to a predetermined temperature, and thence through line 89 into the mixing chamber 14.

As a specific example of one operation of the process of the present invention, the charging stock is a 33° API gas oil. One part of fresh charging stock is mixed with two parts of recycle stock and the mixture is heated to approximately 850° F. It is then flashed into vapors in the evaporators, and the vapors are then further heated in the superheater coils to approximately 960° F. The superheated vapors are mixed in a mixing chamber with the dehydrogenated heat carrier gas at approximately 1200° F. and of such volume that the resulting mixture has a temperature of approximately 1010° F. The mixture discharges into the reaction chamber where it is held for 2 minutes, more or less, under a pressure of approximately 100 pounds per square inch gage pressure. As the reaction mixture leaves the reaction chamber, it is shock-chilled to approximately 800°–880° F. by an injection of cold previously-formed distillate, and enters the scrubber where any cracked tars and free carbon are scrubbed out of the vapors. The vapors then pass through a heat exchanger where they heat up the incoming fresh charging stock to 300°–400° F. and pass into the fractionating column where they are separated into recycle stock and motor fuel plus fixed gases. The recycle stocks falls to the bottom of the column and is withdrawn therefrom at approximately 500° F. The vapors and fixed gases are withdrawn from the column at approximately 380° F. They are then cooled and their motor fuel content condensed and separated from the uncondensed fixed gases. These latter gases are then scrubbed with a sodium carbonate solution to remove their hydrogen sulfide content, and then passed through absorption equipment which separates them into two fractions, one of which consists largely of hydrogen and methane, and the other consists largely of the C₂ and heavier hydrocarbons. This latter fraction is then compressed to approximately 500 pounds per square inch gage pressure, heated to approximately 400° F., and under this pressure and temperature is passed over a solid phosphoric acid catalyst which polymerizes the unsaturates in the gas to a polymer liquid suitable for motor fuel. The products leaving the catalyst are cooled, the polymer liquid is condensed and separated from the remaining unconverted gases. These latter gases are heated to approximately 1200° F., passed over an active alumina dehydrogenating catalyst, and at this temperature enter the mixing chamber for admixture with the super-heated oil vapors to be cracked. As thus operated, the yields obtained will be approximately 10.8% fuel oil, 65.0% cracked gasoline, approximately 12% polymer liquid, and approximately 12.2% fixed gas. The ratio between the yield of cracked gasoline and polymers depends upon the amount of C₂ and heavier hydrocarbons dehydrogenated and subsequently polymerized. Addition of such gases as propane from outside sources can increase very materially the yield of polymer liquid and fixed gases.

It is to be understood the reason for carrying out dehydrogenation, cracking, and polymerization in three separate zones or stages is that operating conditions and techniques may be employed in each of the separate zones which are best suited to yield the maximum amount of the particular products desired from the particular reactions occurring in each of the separate zones, and yet the separate operations of the three separate zones are combined into a single, unitary process, as described, by means of which the maximum possible yields of desired products are obtained with minimum yields of undesirable by-products such as cracked tars and fixed gases.

It is thought that the many advantages of the process in accordance with this invention can be readily understood, and although the preferred embodiment thereof is as illustrated and described, yet it is to be understood that changes in detail of construction and operation can be had which fall within the scope of the invention as claimed.

I claim:

1. A process of converting hydrocarbons comprising: vaporizing a hydrocarbon charging stock, separating unvaporized residuum therefrom, cracking the vapors while in contact with a hydrocarbon heat carrier gas heated to a sufficiently high temperature to supply heat for cracking, passing the heat carrier gas through a dehydrogenating catalyst to convert saturated hydrocarbons therein to olefines, thereafter heating the gas to the cracking temperature and mixing it with the vaporized hydrocarbon charging stock, treating the cracked vapor-gas mixture to separate a cycle stock, a motor fuel distillate, a gas residue and a liquid residuum, catalytically polymerizing gas residue, separating polymer distillate from gas residue and returning gas residue from which the polymer distillate has been separated to the dehydrogenation zone as heat carrier gas.

2. The process defined in claim 1 in which the heat carrier gas is catalytically dehydrogenated and immediately superheated before being mixed with the vapors in the cracking zone.

3. The process defined in claim 1 in which the gases leaving the cracking zone are treated to remove hydrogen and methane before being introduced into the polymerization zone.

4. The process defined in claim 1 in which the heat carrier gas is treated to remove sulfur constituents and catalytically dehydrogenated before being mixed with the vapors being cracked.

5. The process defined in claim 1 in which hydrocarbons containing C₂ and higher carbon atoms to the molecule are separated from the polymerization residue gas and this separated gas returned to the dehydrogenation stage as a carrier gas.

6. The process defined in claim 1 in which the step of vapor phase cracking consists in vaporizing the charging stock, separating the evolved vapors from the unvaporized residue, heating the vapors by indirect heat exchange, mixing the superheated vapors with the heat carrier gas in a suitable device which thoroughly and substantially instantaneously mixes the vapors and gas, and discharging the mixture of gas and vapors into an enlarged space of such diameter and length as to provide the necessary time interval for the completion of the desired degree of cracking while the mixture is traveling therethrough.

7. The process defined in claim 1 in which steam is added to the polymerization residue gas before it is passed into the dehydrogenation zone.

8. The process defined in claim 1 in which the temperature in the cracking zone is sufficiently increased to increase the volume of polymer distillate while decreasing the volume of distillate formed by cracking.

9. The process defined in claim 1 in which gas from an external source containing C₂ and higher carbon atoms to the molecule is added to the carrier gas before introducing it into the dehydrogenation zone, and superheating the dehydrogenated gas before passing it into the cracking zone to increase the volume of polymer distillate.

10. A vapor phase cracking process comprising: vaporizing a hydrocarbon charge oil, separating residual oil from vaporized fractions, superheating said vaporized fractions, admixing heat carrier gas with the superheated vapors to raise the vapors to cracking temperature and passing the mixture at cracking temperature through a reaction zone, fractionating the reaction products to separate fractions heavier than gasoline, gasoline and gases, passing the gases to a catalytic polymerization zone to polymerize olefinic components to gasoline, fractionating the polymerization products to separate out motor fuel fractions from unconverted residual gases, fractionating said residual gases to secure a fraction comprising principally C₂ and heavier hydrocarbons, dehydrogenating said last mentioned fraction at elevated temperatures and without substantial loss of heat, utilizing the dehydrogenated gases as the heat carrier gas first mentioned.

11. The process defined in claim 10 including the additional step of promoting dehydrogenation of the heat carrier gas by means of a dehydrogenating catalyst.

12. The process defined in claim 10 including the additional step of adding to the unconverted gaseous residue from the polymerization zone, and prior to the dehydrogenation zone, an additional volume of hydrocarbons, said hydrocarbons to contain from two to six carbon atoms.

13. The process defined in claim 10 in which the heat carrier gas is dehydrogenated and then superheated before being mixed with the superheated charging stock vapors.

14. The process defined in claim 1 in which the gases leaving the polymerization zone are treated to remove hydrogen and methane before being introduced into the dehydrogenation zone.

WILLIAM O. KEELING.

REFERENCES CITED

The following references are of record in the file of this patent:

UNITED STATES PATENTS

| Number | Name | Date |
|---|---|---|
| 1,613,010 | Armstrong | Jan. 4, 1927 |
| 1,842,318 | Beardsley | Jan. 19, 1932 |
| 1,984,569 | Cooke | Dec. 18, 1934 |
| 2,129,506 | Sachs | Sept. 6, 1938 |
| 2,170,275 | Nelson | Aug. 22, 1939 |
| 2,215,062 | Atwell | Sept. 17, 1940 |
| 2,249,584 | Thomas | July 15, 1941 |
| 2,253,607 | Boyd | Aug. 26, 1941 |
| 2,265,510 | Borden | Dec. 9, 1941 |
| 2,276,103 | Seguy | Mar. 10, 1942 |